(12) United States Patent
Bossan et al.

(10) Patent No.: US 12,270,318 B1
(45) Date of Patent: Apr. 8, 2025

(54) HYBRID METAL/COMPOSITE BLADE WITH TEXTILE ORIENTATION ADAPTED TO MECHANICAL STRESSES

(71) Applicant: SAFRAN AIRCRAFT ENGINES, Paris (FR)

(72) Inventors: Pierre-Antoine Bossan, Moissy-Cramayel (FR); François Charleux, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/835,233

(22) PCT Filed: Jan. 27, 2023

(86) PCT No.: PCT/FR2023/050107
§ 371 (c)(1),
(2) Date: Aug. 1, 2024

(87) PCT Pub. No.: WO2023/148443
PCT Pub. Date: Aug. 10, 2023

(30) Foreign Application Priority Data

Feb. 2, 2022 (FR) ...................... 2200933

(51) Int. Cl.
*F01D 5/28* (2006.01)
*F01D 5/14* (2006.01)
*F01D 25/00* (2006.01)

(52) U.S. Cl.
CPC ............. *F01D 5/282* (2013.01); *F01D 5/147* (2013.01); *F01D 25/005* (2013.01);
(Continued)

(58) Field of Classification Search
CPC ........ F01D 5/147; F01D 5/282; F01D 25/005; F05D 2300/603
See application file for complete search history.

(56) References Cited

U.S. PATENT DOCUMENTS 8,499,450 B2 * 8/2013 Naik .................... D03D 13/004
29/889.71
8,662,855 B2 * 3/2014 Naik ...................... F01D 5/284
29/889.71
(Continued)

FOREIGN PATENT DOCUMENTS

CN 102741043 A 10/2012
CN 112469886 A 3/2021
(Continued)

OTHER PUBLICATIONS

International Search Report as issued in International Patent Application No. PCT/FR2023/050107, dated May 22, 2023.
(Continued)

*Primary Examiner* — Christopher R Legendre
(74) *Attorney, Agent, or Firm* — Pillsbury Winthrop Shaw Pittman LLP

(57) ABSTRACT

A blade made of a composite material, the blade including a fibrous reinforcement densified by an organic matrix and being provided, in an attachment zone, with a metal element, wherein the reinforcement includes, in at least one region of the attachment zone, a surface textile orientation adapted to the direction of mechanical stresses by having first skin threads that extend in a main mechanical stress direction and that are bonded to second skin threads transverse to the first threads, the first skin threads making up most of the surface area of the region of the attachment zone.

6 Claims, 2 Drawing Sheets

(52) U.S. Cl.
CPC ...... *F05D 2220/30* (2013.01); *F05D 2240/12* (2013.01); *F05D 2240/30* (2013.01); *F05D 2300/603* (2013.01)

(56) References Cited

U.S. PATENT DOCUMENTS

| | | | | |
|---|---|---|---|---|
| 9,162,750 | B2 * | 10/2015 | Coupe | B64C 11/26 |
| 9,598,966 | B2 * | 3/2017 | Klein | F01D 5/147 |
| 10,745,109 | B2 * | 8/2020 | Schneider | B23P 15/04 |
| 11,686,203 | B2 * | 6/2023 | Pouzadoux | F01D 5/282 |
| | | | | 416/230 |
| 11,773,733 | B2 * | 10/2023 | Notarianni | F01D 5/282 |
| | | | | 416/230 |
| 2013/0017094 | A1 | 1/2013 | Coupe et al. | |
| 2020/0223531 | A1 | 7/2020 | Courtier et al. | |
| 2021/0293152 | A1 | 9/2021 | Joudon et al. | |

FOREIGN PATENT DOCUMENTS

| | | |
|---|---|---|
| FR | 2 989 991 A1 | 11/2013 |
| FR | 3 107 719 A1 | 9/2021 |
| FR | 3 108 143 A1 | 9/2021 |
| FR | 3 108 666 A1 | 10/2021 |

OTHER PUBLICATIONS

International Preliminary Report on Patentability and the Written Opinion of the International Searching Authority as issued in International Patent Application No. PCT/FR2023/050107, dated Aug. 6, 2024.

\* cited by examiner

[Fig. 1]
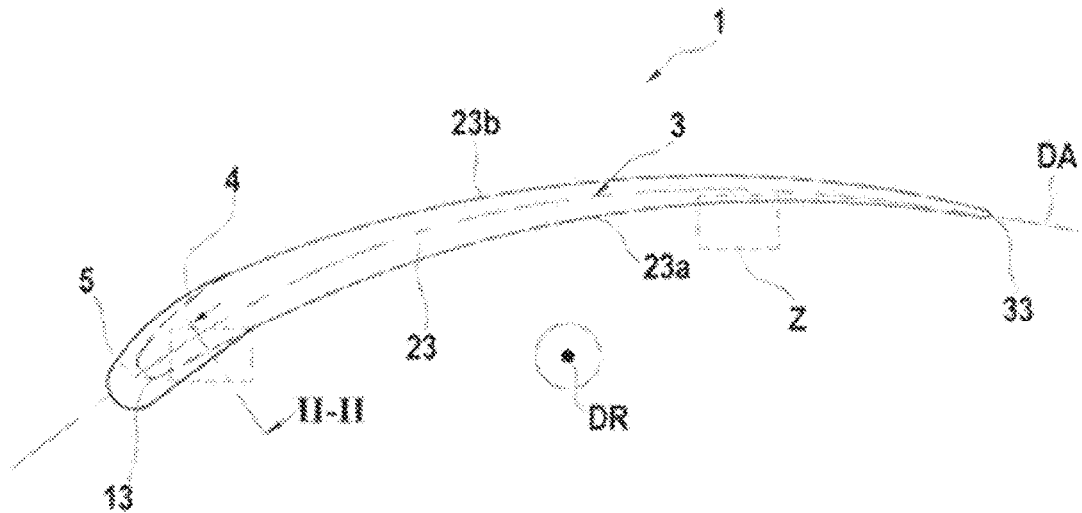
[Fig. 2]
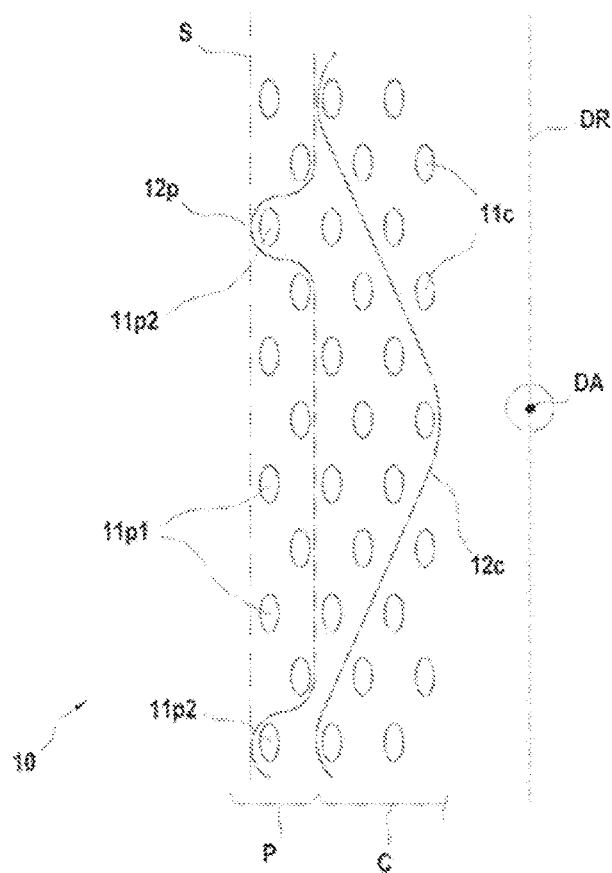

[Fig. 3]
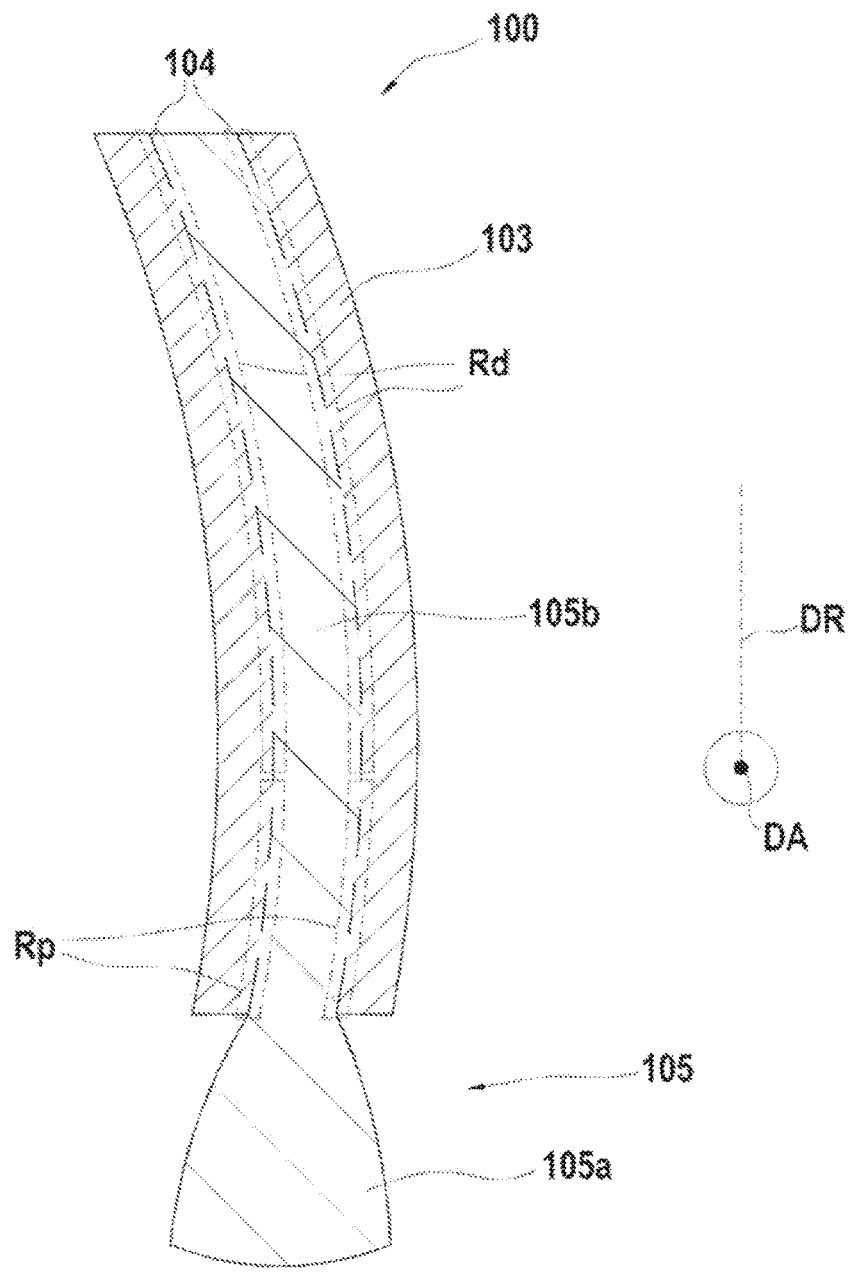

HYBRID METAL/COMPOSITE BLADE WITH TEXTILE ORIENTATION ADAPTED TO MECHANICAL STRESSES

CROSS-REFERENCE TO RELATED APPLICATIONS

This application is the U.S. National Stage of PCT/FR2023/050107, filed Jan. 27, 2023, which in turn claims priority to French patent application number 2200933 filed Feb. 2, 2022. The content of these applications are incorporated herein by reference in their entireties.

TECHNICAL FIELD

The invention relates to a blade or vane made of a composite material with an organic matrix (hereinafter referred to as "CMO material") provided with a metal element and the textile orientation of which is adapted to mechanical stresses on all or part of the zone of attachment with this element in order to reduce the risk of separation of the latter.

PRIOR ART

It is known to use parts made of CMO material for the production of cold portion elements of aeronautical turbomachines, such as fan blades. It is also known to add a metal element to the composite in order to improve its properties, for example to stick a protective metal foil on a leading edge of a fan blade in order to improve the resistance to impacts encountered in operation (bird impacts, hailstones or debris). However, the stresses exerted during operation can in certain cases lead to a separation of the metal element. The invention aims at overcoming this problem.

DISCLOSURE OF THE INVENTION

The invention relates to a blade or vane made of a composite material, the blade or vane comprising a fibrous reinforcement densified by an organic matrix and being provided, in an attachment zone, with a metal element, the blade or vane being characterized in that the reinforcement comprises, in at least one region of the attachment zone, a surface textile orientation adapted to the direction of mechanical stresses by having first skin threads that extend in a main mechanical stress direction and that are bonded to second skin threads transverse to the first threads, said first skin threads being a majority on the surface of said region of the attachment zone.

The inventors have noted that the orientation of the threads on the surface of the reinforcement on the attachment zone has an impact on the attachment of the metal element to the CMO material in operation. The invention thus proposes to favor over all or part of the attachment zone the first threads which are oriented along the main stress direction in order to reduce the risk of separation of the metal element. The main stress direction depends on the type of blade or vane and metal element considered and can be determined without difficulty by a person skilled in the art. The main stress direction can correspond to an axial direction of the blade or vane (direction corresponding to the chord of the blade or vane and the direction of air flow), or to a radial direction of the blade or vane (direction corresponding to the axis joining the root to the top of the blade or vane).

In an exemplary embodiment, a proportion of the first skin threads on the surface is at least equal to twice a proportion of the second skin threads on the surface in said region of the attachment zone.

Such an example is particularly adapted to mechanical stresses exerted predominantly in a given direction.

In an exemplary embodiment, the fibrous reinforcement is woven by having, at least in the skin, an evolving weave between the region of the attachment zone and a zone of the blade or vane located outside the attachment zone.

In this case, there is a local adaptation of the reinforcement to improve the grip of the metal element without the reinforcement being modified outside the attachment zone. The textile can thus be designed differently in the attachment zone and outside it in order to obtain optimal properties.

In an exemplary embodiment, the attachment zone comprises a first region with a first proportion of first surface threads, and a second region, distinct from the first region, with a second proportion of first surface threads, distinct from the first proportion.

Such an example is particularly adapted to the case where the orientation of the mechanical stresses varies significantly in the attachment zone, thus further reducing the risk of separation of the metal element. According to this example, the first threads are in the majority in the first region but more necessarily in the second region where they can always be in the majority or in which the second threads can be in the majority. In particular, it is possible to have a balanced proportion, approximately 50/50, of first and second threads in the second region.

The following discusses different examples of blades or vanes that may be concerned by the invention.

In an exemplary embodiment, the metal element is a protective foil covering a leading edge of the blade or vane, and the main mechanical stress direction corresponds to an axial direction of the blade or vane. In particular, the blade may be a fan blade. According to one variant, the vane is an outlet guide vane ("OGV").

According to another example, the blade or vane defines an internal cavity and the metal element is a spar inserted in this internal cavity, the main mechanical stress direction corresponding to a radial direction of the blade or vane.

BRIEF DESCRIPTION OF THE DRAWINGS

FIG. 1 is a sectional view of an example of a blade or vane according to the invention provided with a protective metal foil taken transversely to a radial direction.

FIG. 2 shows a detail of the fibrous reinforcement of the blade or vane of FIG. 1 on the attachment zone in a plane transverse to an axial direction.

FIG. 3 shows a variant of a blade according to the invention.

DESCRIPTION OF EMBODIMENTS

FIG. 1 shows a blade or vane 1 comprising a CMO material 3 provided with a protective metal foil 5. Generally speaking, the blade 1 can be a rotating blade or a fixed vane. The example of FIG. 1 relates to a rotating blade, here a fan blade. The CMO material 3 comprises a fibrous reinforcement 10 the structure of which will be described below and which is densified by an organic matrix. By way of illustration, the fibrous reinforcement 10 can be formed from carbon strands, and the matrix can be an epoxy resin. However, the person skilled in the art will recognize that other materials can be used depending on the considered application. The CMO material 3 has a leading edge 13 at an upstream end and a trailing edge 33 at a downstream end, as well as an aerodynamic profile 23 between the leading edge 13 and the trailing edge 33. Unless otherwise stated, the terms "upstream" and "downstream" are taken in relation to the direction of air flow. In a manner known per se, the profile 23 comprises a lower surface 23a and an upper surface 23b the shape of which is adapted to the desired aerodynamic properties. The air flows around the blade 1 along an axial direction DA and the blade 1 extends along a radial direction DR.

In the example of FIG. 1, the foil 5 is added onto the CMO material 3 in an attachment zone 4 located on the leading edge 13. The foil 5 allows to protect the CMO material 3 from the impacts of objects, such as hailstones, birds or debris. For example, the foil 5 can be made of titanium or a titanium alloy. The foil 5 can be secured to the CMO material 3 by gluing.

FIG. 2 shows a possible example of textile orientation of the fibrous reinforcement 10 on the attachment zone, adapted to the directions of mechanical stresses undergone in operation in order to improve the attachment of the metal element 5. The adapted textile orientation is present in the skin P of the fibrous reinforcement 10, that is to say in its surface zone S facing the metal element 5, here on its external surface. The fibrous reinforcement has different textile characteristics between the skin P and the core C, here a different weaving pattern. The fibrous reinforcement 10 comprises first skin threads $11p1$-$11p2$ oriented along the axial direction DA and bonded to second skin threads $12p$ transverse to the first threads $11p1$-$11p2$. In the example illustrated, the first skin threads $11p1$-$11p2$ are woven with the second skin threads $12p$ using a two-dimensional weave, for example with a satin pattern. The invention is, however, not limited to such an embodiment. The first skin threads $11p1$ appear more on the surface S than the second threads $12p$, thus allowing to provide better resistance to mechanical stresses which are exerted here mainly along the axial direction DA. The second skin threads $12p$ bind the first skin threads $11p1$-$11p2$ by being covered by a first portion $11p1$ of the first skin threads which then appear on the surface S, and by covering a second portion $11p2$ of the first skin threads, the second skin threads $12p$ then appearing locally on the surface S. For each second skin thread $12p$, the number of first skin threads $11p1$ in the first portion may be greater than the number of first skin threads $11p2$ in the second portion. In all or part of the attachment zone, the area defined by the portions of first skin threads $11p1$ on the surface S is here greater than that defined by the portions of second skin threads $12p$ on the surface S. In the example illustrated, the fibrous reinforcement 10 has a three-dimensional weave at the core C, for example with an "interlock" pattern, in which the second core threads $12c$ weave several layers of first core threads $11c$. The weaving evolves so as to locally modify the textile orientation in the skin P compared to that in a zone Z located outside the attachment zone 4. In particular, only the weaving pattern in the skin P can be adapted on the attachment zone 4, without modification of the core weaving pattern C. The adapted textile orientation can extend over the entire attachment zone 4, or only over a fraction thereof, for example over only a portion of its height. Generally speaking, the adapted textile orientation where the first skin threads $11p1$-$11p2$ are in the majority can extend over an area at least equal to 10%, for example at least equal to 50%, of the area of the attachment zone 4. Generally speaking, the first threads $11p1$-$11p2$, $11c$ can be the weft threads and the second threads $12p$, $12c$ the warp threads, but this does not depart from the scope of the invention when the opposite is considered.

The description of FIGS. 1 and 2 which has just been made has provided various details relating to the structure of an example of hybrid blade 1 according to the invention. The following discusses a possible manufacturing example of this blade 1.

The fibrous reinforcement 10 is first produced by weaving, using means known per se, and by providing in the attachment zone 4 a majority proportion of first skin threads $11p1$ on the surface S, as illustrated in FIG. 2. The metal foil 5 is then covered with an adhesive then added onto the fibrous reinforcement 10 on the attachment zone 4. The assembly is then placed in a mold and a resin is introduced so as to impregnate the porosity of the fibrous reinforcement, for example by implementing a technique known per se of resin transfer molding ("RTM"). The assembly is then baked in the mold so as to crosslink the resin, and thus obtain the organic matrix, as well as the adhesive and create a bond between the foil and the resin. The blade 1 ready to be mounted on a turbomachine fan disk, after carrying out any finishing operations such as machining or the deposition of paint, is thus obtained. According to this method, the same baking step is used to crosslink both the resin and the adhesive, thus simplifying the implementation compared to the case where the foil 5 is glued to the CMO material prepared beforehand.

In the example of hybrid blade 1 of FIGS. 1 and 2, the metal element 5 is disposed on the external surface of the CMO material 3, in this case on its leading edge 13. The invention is however not limited to such an embodiment as shown in FIG. 3, relating to a metal element introduced inside the CMO material, which will be described below.

The blade 100 illustrated in FIG. 3 comprises a metal spar 105 defining a root 105a intended to be fixed to a rotating disk and a section 105b of armature introduced into an internal cavity of the CMO material 103 with a fixing of the section 105b for example by gluing in an attachment zone 104. The blade 100 can for example be a non-ducted fan blade ("open fan"). Similar to what was described above, the textile orientation on the surface of the CMO reinforcement 103 is adapted on the attachment zone 104 to the mechanical stresses encountered.

However, in the illustrated case it is more specific insofar as the attachment zone 104 has two distinct regions Rp and Rd, offset along the radial direction DR and not overlapping, which have a distinct textile orientation. The distal region Rd has a higher proportion of first surface threads which are directed here along the radial direction DR in order to withstand the centrifugal loading of the part. The details described above in connection with FIG. 2 relating to the majority character of the first threads and their bond with the second threads are applicable mutatis mutandis taking into account the difference in wire orientation. The proximal region Rp, region closer to the root 105a, undergoes a more balanced loading and therefore a proportion of first threads on the surface lower than that in the distal region Rd can be adopted, in particular it is possible to have a proportion substantially 50/50 between the first and second threads in this region. In general, the invention proposes to adapt the skin textile orientation on the attachment zone to the stresses in operation, the case where at least one region of the attachment zone comprised a proportion of first threads greater than that of the second threads has been described. However, in a particular case of the invention, it is possible to have an attachment zone having at least locally a balanced distribution, substantially 50/50, of first and second threads, a proportion of first threads oriented along the main mechanical stress direction of 50% also being considered as the majority within the meaning of the invention.

The invention claimed is:

1. A blade or vane made of a composite material, the blade or vane comprising:
   a fibrous reinforcement densified by an organic matrix and comprising a skin and a core,
   a metal element attached to the fibrous reinforcement on an attachment zone of the skin;
   wherein the reinforcement comprises, in at least one region of the attachment zone, a surface textile orientation adapted to the direction of mechanical stresses by having first skin threads that extend in a main mechanical stress direction and that are bonded to second skin threads transverse to the first threads, said first skin threads being a majority of all the threads on the surface of said region of the attachment zone, and wherein a textile orientation of the core is different than the surface textile orientation;
   wherein:
      the metal element is a protective foil covering a leading edge of the blade or vane, and the main mechanical stress direction corresponding to an axial direction of the blade or vane which corresponds to a chord of the blade or vane, or
      the blade or vane being a blade and defining an internal cavity and the metal element being a spar inserted in this internal cavity, the spar defining a root intended to be fixed to a rotating disk, the main mechanical stress direction corresponding to a radial direction of the blade which corresponds to an axis joining the root to a top of the blade.

2. The blade or vane according to claim 1, wherein a proportion of the first skin threads on the surface is at least equal to twice a proportion of the second skin threads on the surface in said at least one region of the attachment zone.

3. The blade or vane according to claim 1, where the fibrous reinforcement is woven by having, at least in the skin, an evolving weave between the at least one region of the attachment zone and a zone of the blade located outside the attachment zone.

4. The blade or vane according to claim 1, wherein the at least one region of the attachment zone comprises a first region with a first proportion of first surface threads, and a second region, distinct from the first region, with a second proportion of first surface threads, distinct from the first proportion.

5. The blade or vane according to claim 1 being a fan blade and wherein the metal element is the protective foil.

6. The blade or vane according to claim 1 being an outlet guide blade and wherein the metal element is the protective foil.

* * * * *